United States Patent [19]
Scraper

[11] 3,741,326
[45] June 26, 1973

[54] APPARATUS FOR WEIGHING SAMPLES
[75] Inventor: Robert D. Scraper, Hiawatha, Kans.
[73] Assignee: Mid-America Testing Service, Inc., Hiawatha, Kans.
[22] Filed: June 21, 1971
[21] Appl. No.: 155,126

[52] U.S. Cl.................... 177/59, 177/83, 177/85, 177/102, 177/118
[51] Int. Cl.................... G01g 11/00, G01g 13/00
[58] Field of Search..................177/52–59, 83–88, 177/90, 98, 102, 103, 105, 108–110, 114, 115, 116, 118

[56] References Cited
UNITED STATES PATENTS
1,190,364  7/1916  Anderson et al..................... 177/98

FOREIGN PATENTS OR APPLICATIONS
334,107  8/1930  Great Britain...................... 177/116

*Primary Examiner*—Richard B. Wilkinson
*Assistant Examiner*—Stanley J. Witkowski
*Attorney*—Schmidt, Johnson, Hovey & Williams

[57] ABSTRACT

A material weighing apparatus for collecting a predetermined amount, by weight, of material. A feeding structure in the nature of rollers is provided for metering the material in a uniform and steady flow to a collector. A shiftable spout is positioned below the feeding structure for diverting the flowing material away from the collector when a weight-sensing mechanism has determined that the proper amount of material has been received by the collector.

7 Claims, 6 Drawing Figures

INVENTOR.
Robert D. Scraper

INVENTOR.
Robert D. Scraper

BY
Schmidt, Johnson, Hovey & Williams
ATTORNEYS.

APPARATUS FOR WEIGHING SAMPLES

This invention relates to an improved apparatus for obtaining samples of material that require a specific, predetermined amount, by weight, for testing purposes. More specifically, the present invention relates to a gram scale to be used in connection with a moisture tester for grain or the like. In running the moisture test it is necessary to obtain an exact predetermined amount of grain for placing in the tester. One of the many disadvantages of prior material weighing apparatuses is the delay between the time that a weight-sensing means determines that a certain amount of material has been collected and the transmittal of such information to a means for stopping the flow of material into a collector. Consequently, the material that is enroute between the feed structure and the collector is added to the material in the collector after weighing, thereby causing the sample to be greater in amount than desired.

It is, therefore, the primary object of this invention to provide an accurate material sample collecting and weighing apparatus.

It is a further important object of my invention to provide a material weighing apparatus that will automatically divert the flow of the material away from the collector when the proper amount of material by weight has been collected.

It is another important object of this invention to provide an apparatus for weighing samples that will provide a uniform, steady and therefore more easily controlled flow of material to the sample collector.

Figure 1:
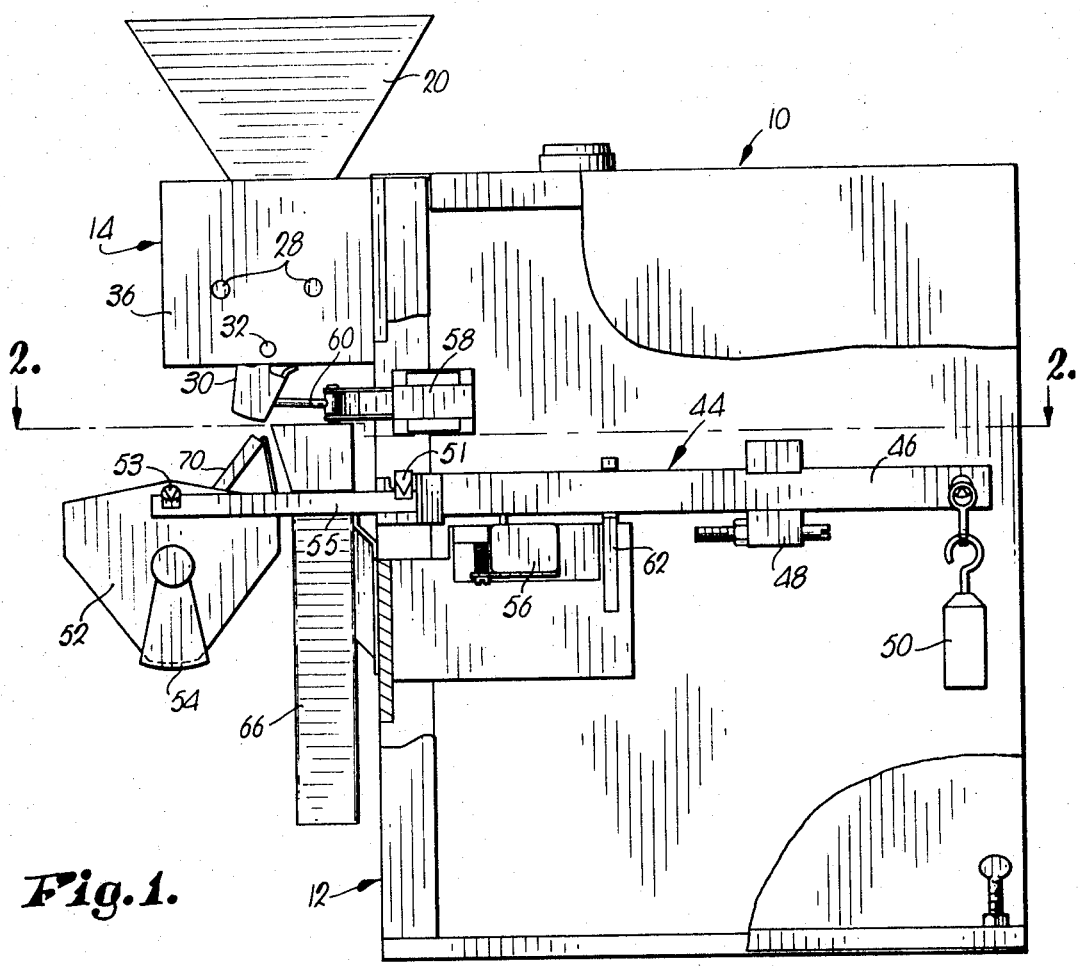
FIG. 1 is a side elevational view of the material weighing apparatus, parts being broken away for clearness.
Figure 2:
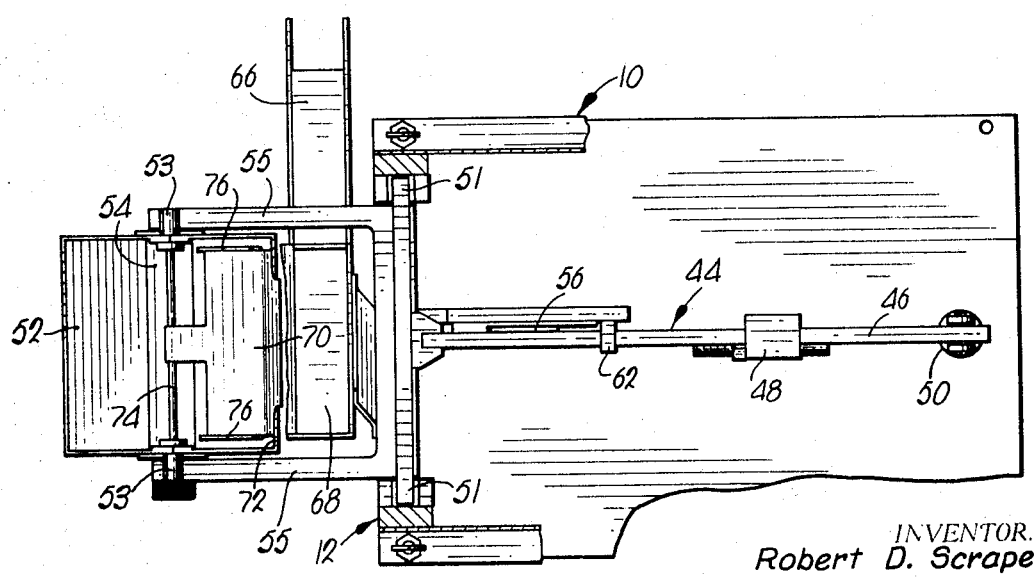
FIG. 2 is a cross-sectional view taken along line 2—2 of FIG. 1.
Figure 5:
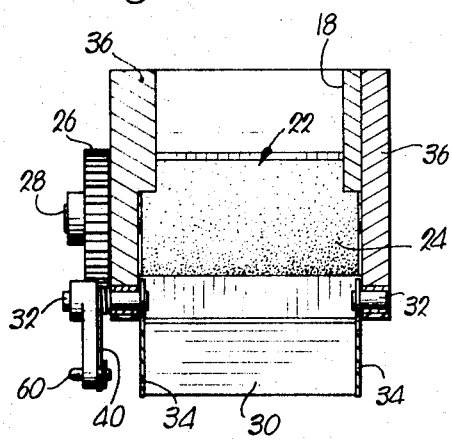
FIG. 5 is a fragmentary, detailed, cross-sectional view taken along line 5—5 of FIG. 4.
Figure 3:
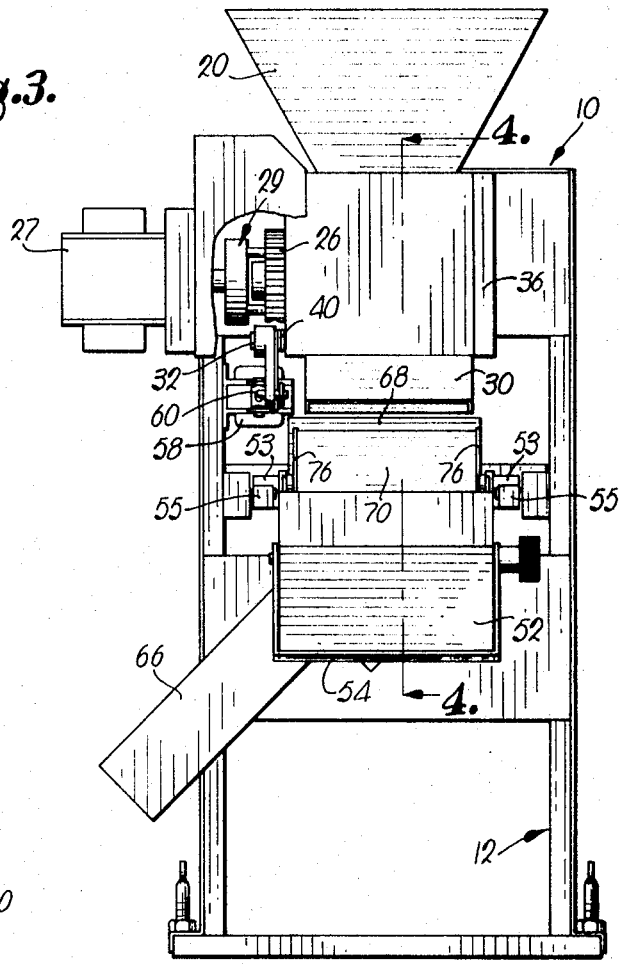
FIG. 3 is an end elevational view of the apparatus, a part being broken away for clarity.

Apparatus 10 includes a frame 12 supporting a transversely, elongated, funnel-shaped hopper 14 having an outlet 16 disposed to permit gravitational flow of the material therefrom. Hopper 14 is further provided with an upper portion defining an inverted, cone-shaped, hollow vessel 20 for holding the material, and an elongated, transversely rectangular tube 18 extending downwardly from vessel 20 and terminating at the outlet 16.

Figure 4:
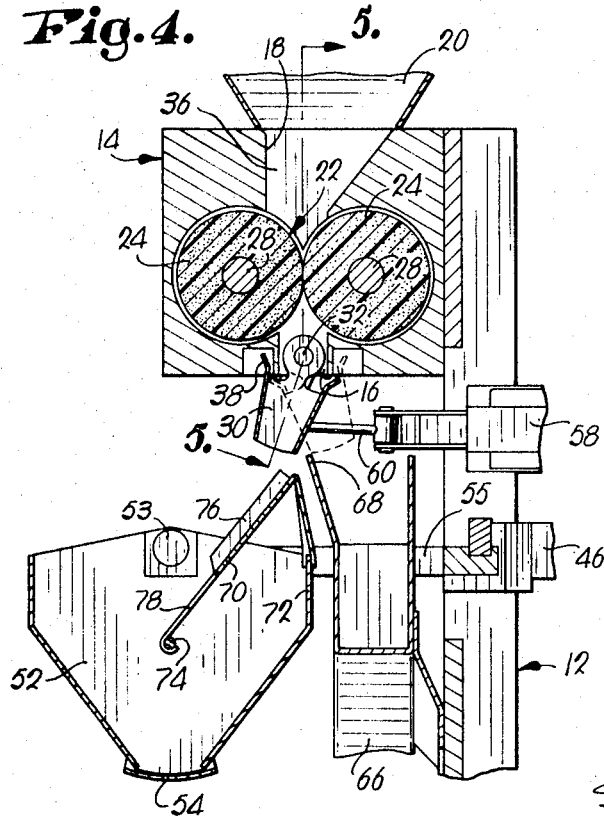
FIG. 4 is an enlarged, fragmentary, detailed, vertical cross-sectional view taken along line 4—4 of FIG. 3.
Figure 6:
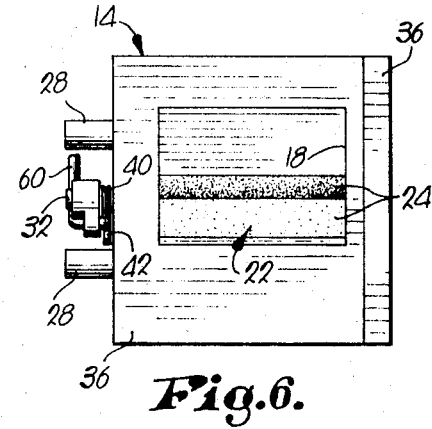
FIG. 6 is a top plan view of the hopper and feeding structure, parts being removed for clarity.

A structure in the nature of a pair of rollers 22 in tangent relationship, (best seen in FIG. 4) for feeding the material from vessel 20 and through the outlet 16 in a uniform and steady flow, is positioned with respect to tube 18 so that the point of tangency of the rollers 22 is located transversely across tube 18 and between outlet 16 and vessel 20. Rollers 22, each provided with a cylindrical, resilient body 24, are rotatable on parallel axes. A pair of intermeshing gears 26 are affixed to shafts 28 of rollers 22 for driving the rollers 22 in counterrotation and at a uniform angular velocity for uniformly metering the material through outlet 16. A gear motor 27 is mounted to support 12 and operably coupled to one of the gears 26 by means of a disc and pin assembly 29 for driving rollers 22.

A flow diverting means in the nature of a shiftable spout 30 is swingably attached to the tube 18 of hopper 14 between rollers 22 and outlet 16 by a pair of trunnions 32 affixed to sides 34 of spout 30 and pivoted in side members 36 of hopper 14. Inlet 38 of spout 30 is thereby positioned relative to outlet 16 to permit constant communication therebetween as spout 30 oscillates about the axes of trunnions 32. A spring 40 is attached to one of the trunnions 32 and connected by means of a pin 42 with hopper 14 for orienting spout 30 to a position offset from its vertical axis for directing the flowing material into a collector 52.

A weight-sensing mechanism 44 comprised of a bifurcated weighbeam 46 and counterpoise members 48 and 50 is supported by means of a knife-edge fulcrum 51 on frame 12. Open top collector 52 is provided with knife-edge studs 53 carried by arms 55 of weighbeam 46 in a position to receive the material as it flows from hopper 14 through spout 30. A movable gate 54 in collector 52 may be provided for permitting the emptying of the material from collector 52 with or without removing collector 52 from weighbeam 46. An electrical switch 56 is coupled with an electromagnet 58 having its core connected with spout 30 by linkage 60 for operation when the mechanism 44 senses that a predetermined amount, by weight, of material has accumulated in collector 52. A limiter 62 is provided to restrict the rotational movement of weighbeam 46 as it rotates about fulcrum 51.

An elongated, angular chute 66 is supported by frame 12 for directing the diverted flow of material away from apparatus 10 when spout 30 is shifted from its normally spring oriented position by electromagnet 58 and linkage 60. Inlet 68 of chute 66 is located immediately below spout 30 for receiving the material contained within spout 30 as the latter is being shifted as above described.

A device in the nature of an inclined ramp 70 carried by collector 52 within the path of gravitation of the material from spout 30 and disposed in close proximity to the latter, is provided for receiving and causing the material to be weighed as it flows from spout 30. Ramp 70 is supported by a wall portion 72 of collector 52 and rod 74. A pair of flanges 76 are provided along opposed edges 78 of ramp 70 for containing and thus insuring the entry of the material into collector 52.

In operation, the material from which the predetermined sample amount is to be taken is placed in vessel 20. Gear motor 27 activates rollers 22 for uniformly feeding the material therebetween, thus permitting it to be discharged through outlet 16, into and through spout 30 for engagement with ramp 70, and thence into collector 52. As the material accumulates in collector 52 a weight is reached such as to cause the weighbeam 46 to reach a state of balance and close switch 56 which, in turn, activates electromagnet 58 to shift the spout 30 so that the material is diverted from a path of gravitation into collector 52 to a path of gravitation into chute 66. The close proximity of collector 52 and ramp 70 to spout 30 is desirable so that mechanism 44 can sense the weight of the material as quickly as possible after it leaves spout 30.

In sample weighing apparatus such as herein described, it is highly desirable that an accurate and precise amount by weight be obtained. In order to achieve this weight precision, the flow of material into collector 52 must be interrupted quickly and momentarily upon command of the weight-sensing mechanism 44. The instantaneous action of electromagnet 58 in shifting spout 30 upon command of the weighing mechanism 44, causes the material in space between outlet 16 and ramp 60 to be diverted by spout 30 into chute 66, thereby minimizing and essentially eliminating the addition of excess material which might otherwise be added to the sample if outlet 16 were merely closed or the flow otherwise stopped and the material allowed to continue in its path to collector 52.

As beam 46 commences to rise about knife-edge pivot 51 away from switch 56 in response to the weight of the material in the collector 52, spring-loaded switch actuator 57 rises therewith to close the electrical circuit (not shown) for magnet 58, thereby withdrawing its core and exerting a pull on the spout 30 (counterclockwise viewing FIG. 1) through linkage 60. While this action of diverting the material from collector 52 to chute 66 is somewhat instantaneous, nonetheless mechanical delay results in continued flow and in progressively decreased amounts of the material from the spout 30 to the collector 52. Therefore, the weighing mechanism 44 is not responsive to the material that is suspended in air beneath the spout 30, resulting in inaccuracy in proportion to the amount of unweighed suspended material.

Therefore, since the upper edge of the ramp 70 is in close proximity to the outlet end of the spout 30, the gravitating material actually engaging the ramp 70 is weighed during retraction of spout 30 toward the magnet 58. It is to be understood of course, that the weight of the collector 52 and the weight of the ramp 70 thereon are taken into consideration when selecting the counterpoise 50 and adjusting the counterpoise 48.

On the other hand, the use of ramp 70 is not absolutely essential if collector 52 is located as close as possible to the spout 30, keeping in mind that there must be no interference between spout 30 and collector 52 because they must swing about their respective axes 32 and 53.

It is to be further noted that the present invention provides a positive and uniformly controlled flow rate of material so that the possibility of large uncontrolled masses of material entering collector 52 is eliminated. Also, rollers 22 can remain in operation to purge vessel 20 of any excess material via chute 66.

The sample material may then be emptied from collector 52 either by removing the latter from weighbeam 46 or by the use of gate 54 after which weighing mechanism 44 will return to its original position, causing weighbeam 46 to depress switch 56 to deactivate electromagnet 58 and permit spout 30 to return to its original position as determined by spring 40.

Having thus described the invention, what is claimed as new and desired to be secured by Letters Patent is:

1. Precision weighing apparatus for granular material comprising:
   a material-receiving hopper having an outlet disposed for gravitational flow of the material therefrom;
   weight-sensing mechanism;
   a collector carried by said mechanism for receiving material from said outlet;
   a material-diverting spout shiftable to and from a position directing the material from the outlet to the collector;
   structure for feeding the material to said spout in a uniform, steady flow;
   means operably interconnecting said mechanism and said spout for shifting the latter away from said position when the mechanism senses a predetermined amount by weight of said material in the collector; and
   a material lead-in ramp projecting upwardly from said collector into close proximity with the lower end of said spout for assuring weight registration of material between the spout and the collector as well as that deposited in the collector.

2. Material weighing apparatus as claimed in claim 1, wherein said spout is swingably attached to said hopper for oscillation to and from said position.

3. Material weighing apparatus as claimed in claim 1, said spout having an inlet in constant communication with said outlet as said spout is shifted to and from said position.

4. Weighing apparatus as claimed in claim 1, wherein said structure includes a pair of elongated, oppositely driven, resilient metering rolls above the collector in tangential engagement with one another for yielding along their line of interengagement to the grains of material as the grains are forced from above to below the rolls.

5. Precision weighing apparatus for granular material comprising:
   a material-receiving hopper having an outlet disposed for gravitational flow of the grains of material therefrom;
   weight-sensing mechanism;
   a collector carried by said mechanism for receiving material from said outlet;
   a pair of elongated, oppositely driven, resilient metering rolls above said collector in tangential engagement with one another for receiving the material and releasing the same to the collector in a uniform, steady flow as the individual grains deflect the rolls along their line of interengagement and are forced from above to below the rolls;
   a material-diverting spout shiftable to and from a position directing the flow from said rolls to said collector; and
   means operably interconnecting said mechanism and said spout for instantaneously shifting the latter away from said position when the mechanism senses a predetermined amount by weight of said material in the collector.

6. Weighing apparatus as claimed in claim 5, wherein said collector is provided with a device projecting upwardly therefrom into close proximity with the lower end of said spout for receiving the material immediately upon its departure from said spout to thereby assure weight registration of the material between the spout and the collector.

7. Weighing apparatus as claimed in claim 6, wherein said receiving device comprises a ramp.

* * * * *